Patented July 29, 1947

2,424,653

UNITED STATES PATENT OFFICE 2,424,653

PROCESS FOR THE MANUFACTURE OF ETHYL, ALPHA, ALPHA-DIMETHYL BUTYRATE

Thomas Aven Ford, Wilmington, Del., assignor to E. I. du Pont de Nemours & Company, Wilmington, Del., a corporation of Delaware No Drawing. Application April 10, 1946, Serial No. 661,065

5 Claims. (Cl. 260—497)

This invention relates to a process for the preparation of ethyl alpha, alpha-dimethylbutyrate.

This invention has as an object the provision of a new and improved process for the production of ethyl alpha, alpha-dimethylbutyrate in one step from cheap and readily available raw materials. A further object is the preparation of an ethyl ester containing a tertiary alpha carbon atom bearing two methyl groups and one ethyl group. A still further object is to prepare an ethyl ester of a branched chain carboxylic acid of six carbon atoms in which the longest carbon chain contains a maximum of four carbon atoms.

These objects are accomplished by the following invention wherein an intimate mixture of ethylene, propylene and carbon monoxide under pressure is brought into reaction at a temperature within the range 50–200° C. in the presence of a hydrated strong acid catalyst.

Expressed in terms of an equation the total reaction may be represented as:

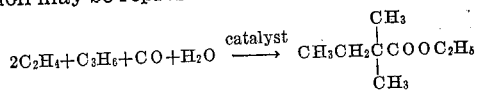

It is seen that this equation prescribes a molar plurality of the total olefinic reactants with respect to the carbon monoxide and water and that futrher the molar ratio of ethylene to propylene is two. In actual practice, this latter ratio may vary considerably.

A more restricted embodiment of this invention comprises heating under a pressure of at least one atmosphere and at a temperature within the temperature range 50–200° C. a mixture of ethylene, propylene, carbon monoxide and a hydrated strong acid catalyst, the total olefins being present in molar excess to the carbon monoxide while the molar ratio of the ethylene to propylene is from 1:1 to 5:1.

The following example is given for illustrative purposes and is not intended to place any restriction or limitation on the herein described invention.

Example

A silver-lined high-pressure reactor having an internal volume of 400 cc. is charged with 103.8 g. of a boron trifluoride hydrate having a mol ratio of $BF_3:H_2O$ of 1:2. The vessel is closed, cooled to —78° C. evacuated and connected with a source of propylene and 84 g. (2 moles) of this olefin is admitted. The vessel is closed, disconnected from the propylene source and then placed in a reciprocating agitating mechanism and fitted with temperature recording and controlling devices. After connecting to a source of ethylene the vessel is pressured at room temperature to 300 atmospheres, closed and disconnected. The quantity of ethylene thus introduced is about 84 g. (3 moles). The vessel is then connected to a source of carbon monoxide and this gas is then admitted to raise the total pressure to 500 atmospheres. Agitation is started and the temperature is raised to 110° C. over a period of about ½ hour. The reaction starts exothermically during this heating period and is accompanied by a drop in pressure. Carbon monoxide is admitted portionwise over a period of about one hour until the pressure is built up to 900 atmospheres while maintaining the temperature at 110° C. The reaction is continued at this temperature and carbon monoxide is added periodically to maintain the pressure in the vicinity of 900 atmospheres. After about 4 hours the reaction is complete as evidenced by the cessation of pressure drop. A total of about 84 g. (3 moles) of carbon monoxide is thus added to the reaction vessel. The reaction vessel is allowed to cool, excess gas is bled off, and the liquid product is discharged.

This reaction product is then diluted with water, steam distilled and the organic layer is separated from the distillate and washed with dilute sodium hydroxide solution to remove acidic components. It is finally washed with water until practically neutral, dried and then submitted to fractionation through a precision column whereby a colorless oil fraction of ethyl alpha, alpha-dimethylbutyrate boiling at 141–150° C. (mainly 142–146° C.) and amounting to 20.2 g. is obtained. This ester possesses a pleasant and also persistent camphoraceous odor. The identity of this ester was confirmed through hydrolysis with an excess of 40% aqueous hydrobromic acid for 10 hours at 180° C. which yielded ethyl bromide and alpha, alpha-dimethyl-butyric acid. This acid gave the following constants: boiling point, 90–91° C./18 mm.; neutral equivalent, 116.5; melting point —15° to —12.5° C. The acid chloride was prepared and converted to the amide, M. P. 104.5°–107° C., anilide, M. P. 95.5°–95.7° C.; p-toluidide, M. P. 83–83.4° C.; and p-anisidide, M. P. 90.5–91° C.

The molar ratio of the total olefinic reactants, ethylene and propylene, with respect to the carbon monoxide may vary within the range of 1:1 to 10:1 or more. In general practice, however, it is preferable to keep the ratio between about 1:1 to 5:1. With regard to the olefin reactants the molar ratio of ethylene to propylene should be from 1:1 to 5:1 and preferably from 3:2 to 3:1.

The temperatures employed in the operation of this process may vary from about 50 to 200° C., although preferably from about 75° to 150° C.

The total pressure of the ethylene, propylene and carbon monoxide in the operation of this process may be as low as about one atmosphere but is preferably higher for example, from about 200 atmospheres to about 1000 atmospheres. The upper limit of pressure which may be used is governed solely by the strength of the equipment available.

Acidic catalysts in general are suitable for the operation of this invention, although the acid-reacting hydrates, for example, such as $BF_3 \cdot (H_2O)_x$, $H_2SO_4(H_2O)_x$, $H_3PO_4 \cdot (H_2O)_x$, and the like are especially desirable. The subscript $x$ in the foregoing formulae may vary from 1 to 5. Preferred catalysts from this list are boron fluoride hydrates with a molar ratio of $BF_3:H_2O$ of from 1:1 to 1:3.

The quantity of ester produced is limited by the amount of water available, and it is hence desirable, although not necessary, to use the hydrated strong acid catalyst in sufficient proportion to provide from one-half to one mole of water per mole of carbon monoxide in the reactor. Additional water may be added during the reaction if desired to maintain the catalyst: water ratio within the preferred range.

This process may be operated as a batch, semi-batch or continuous process. The gaseous reactants may be introduced separately as in the example or they may be premixed in the desired proportions and then charged into the reaction vessel. The reactants and catalysts are maintained in mutual contact such as by agitation as illustrated in the example, by turbulent flow, by efficient bubbling of gases through the liquid phase, or the like.

The ethylene and propylene used in this invention should be of good quality. Small amounts of impurities such as ethane, methane, hydrogen, nitrogen, carbon dioxide, or oxygen may be tolerated if these contaminants are kept sufficiently low. Oxygen however, is notoriously corrosive to the reaction system and the concentration of this impurity should be kept as low as practical.

The carbon monoxide used may be obtained from various commercial sources such as for example, from water gas, producer gas, coke-oven gas and the like. It is preferable, however, to obtain reaction ingredients of high purity with objectionable constituents removed from such commercial gases.

Ethyl alpha, alpha-dimethylbutyrate is useful for various commercial purposes. It may be used as an intermediate in the preparation of pharmaceuticals, in perfumes and as the solvent for a number of plastics and oils. Its high chemical stability and miscibility with representative organic solvents make it particularly useful in a number of these applications.

The foregoing detailed description has been given for clearness of understanding only and no unnecessary limitations should be understood therefrom. The invention is not limitted to the exact details shown and described, for obvious modifications will occur to a person skilled in the art.

What is claimed is:

1. A process for the preparation of ethyl alpha, alpha-dimethylbutyrate which comprises bringing a mixture of propylene, ethylene and carbon monoxide, in which mixture the total olefins are in molar excess of the carbon monoxide, at a pressure of at least one atmosphere and a temperature of 50–200° C. in contact with an acid reacting hydrate.

2. A process for the preparation of ethyl alpha, alpha-dimethylbutyrate which comprises bringing a mixture of propylene, ethylene and carbon monoxide, containing from one to five moles total olefin per mole of carbon monoxide and from one to five moles ethylene per mole of propylene, at a pressure of at least 200 atmospheres and a temperature of 75–150° C. in contact with an acid reacting hydrate.

3. A process for the preparation of ethyl alpha, alpha-dimethylbutyrate which comprises bringing a mixture of propylene, ethylene and carbon monoxide, containing from one to five moles total olefin per mole of carbon monoxide and from one to five moles ethylene per mole of propylene, at a pressure of at least 200 atmospheres and a temperature of 75–150° C. in contact with a boron fluoride hydrate.

4. A process for the preparation of ethyl alpha, alpha-dimethylbutyrate which comprises bringing a mixture of propylene, ethylene and carbon monoxide, containing from one to five moles total olefin per mole of carbon monoxide and from 1.5 to 3 moles ethylene per mole of propylene at a pressure of at least 200 atmospheres and a temperature of 75–150° C. in contact with a boron fluoride hydrate.

5. A process for the preparation of ethyl alpha, alpha-dimethylbutyrate which comprises bringing a mixture of about two moles of propylene and three moles of ethylene in contact with, in final total, about three moles of carbon monoxide at a pressure of 900 atmospheres and a temperature of about 110° C. in contact with boron trifluoride dihydrate ($BF_3 \cdot 2H_2O$).

THOMAS AVEN FORD.

REFERENCES CITED

The following references are of record in the file of this patent:

UNITED STATES PATENTS

| Number | Name | Date |
|---|---|---|
| 2,000,878 | Britton et al. | May 7, 1935 |
| 2,135,459 | Loder | Nov. 1, 1938 |
| 2,378,009 | Hanford et al. | June 12, 1945 |

OTHER REFERENCES

Beilstein, "Hand. der Organ. Chem.," vol. II (4th ed.), 2nd suppl., p. 293.